J. COMBET.
MACHINES FOR MAKING DROP CANDY.

No. 185,498. Patented Dec. 19, 1876.

Witnesses:
Lewis F. Brous,
A. P. Grant.

Inventor:
Jos. Combet,
by John A. Wiedersheim
Attorney.

THE GRAPHIC CO. N.Y.

UNITED STATES PATENT OFFICE.

JOSEPH COMBET, OF PARIS, FRANCE.

IMPROVEMENT IN MACHINES FOR MAKING DROP-CANDY.

Specification forming part of Letters Patent No. 185,498, dated December 19, 1876; application filed October 30, 1876.

*To all whom it may concern:*

Be it known that I, JOSEPH COMBET, of Paris, France, have invented a new and useful Improvement in Apparatus for Making Drop-Candy; and I do hereby declare the following to be a clear and exact description of the nature thereof, sufficient to enable others skilled in the art to which my invention appertains to fully understand, make, and use the same, reference being had to the accompanying drawings, making part of this specification, in which—

Figure 1:
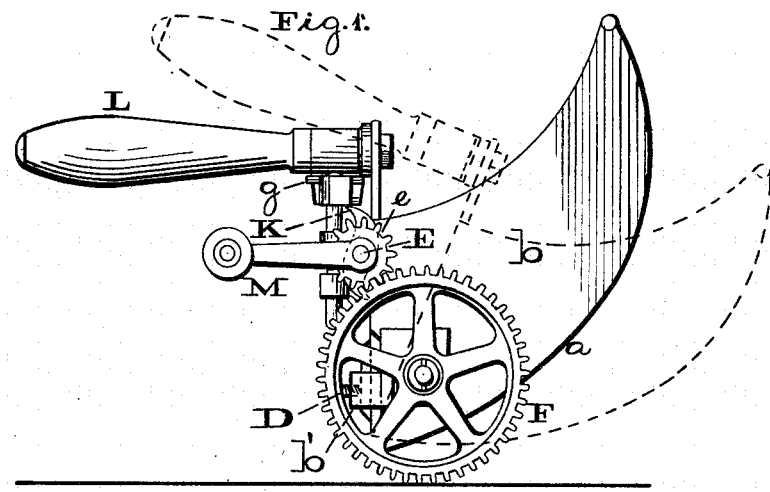
Figure 2:
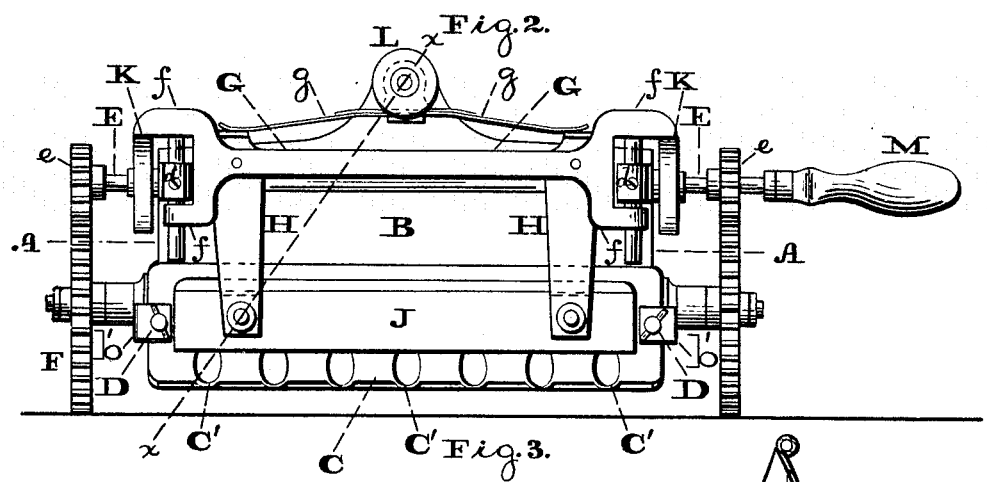
Figure 3:
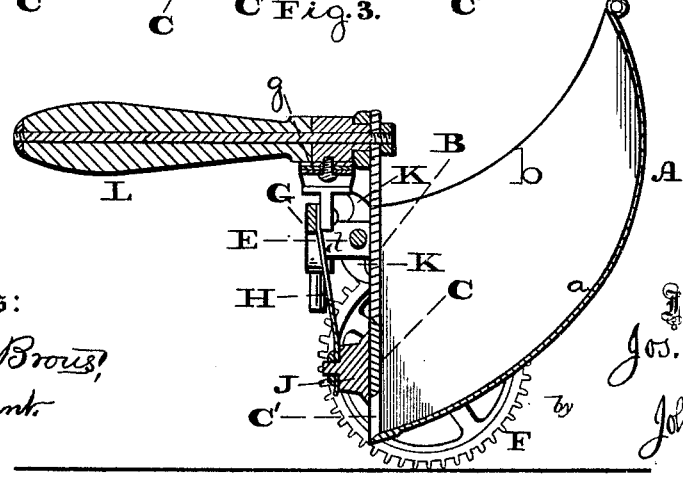

Figure 1 is a side elevation of the apparatus embodying my invention. Fig. 2 is a front view thereof. Fig. 3 is a vertical section in line $x\ x$, Fig. 2.

Similar letters of reference indicate corresponding parts in the several figures.

My invention consists of gear-wheels, on which is mounted a confectioner's pan, so that the pan will be run on said wheels, and the dropping mechanism will be simultaneously operated. It also consists of the dropping-bar, made removable, so as to adapt the machine to the manufacture of candy-drops of various sizes. It further consists in suspending the cut-off bar from springs which hold said bar properly against the dropping-bar. It also consists of a pan having an axial motion, and formed with a curved bottom, the curvatures terminating at the dropping-point, so that every particle of the confectioner's compound will flow from the pan.

Referring to the drawings, A represents a pan for the reception of confectioner's compounds to be formed into drop-candy, said pan consisting of a curved bottom, $a$, and sides $b$ $b$, secured thereto. To the upper part of the side pieces $b$, at what may be termed the front of the apparatus, there is secured a plate, B, and below said plate is fitted a removably-connected bar, C, said plate and bar constituting what may be termed the front side of the pan A, the base of the bar C being formed with a series of openings, $C^1$, extending parallel across the bar. To the sides of the pan A I secure L-shaped pieces $b'$, and behind the front limbs thereof the bar C will be applied. Screws D are passed through the pieces $b'$, and, bearing against the bar C, serve to hold the latter in place. It is evident that by loosening the screws the bar may be readily removed. To the plate B, or sides of the pan A, there are secured bearings $d$ for a rotary shaft, E, to each end of which shaft is connected a pinion, $e$, without which meshes a large toothed wheel, F, whose axial shaft is connected to the pan A near the bar C, the diameters of the wheels F being such that the pan A is elevated and supported thereby. In front of the plate B there is mounted a rising and lowering horizontally-arranged bar, G, each end thereof, preferably, being formed with two bosses, $f$, which slide on pins secured to the plate B, and thereby receive uniform motions. From the said bar G there depend two or more springs, H, whose lower ends are fitted to and pressing against a bar, J, which I term the cut-off, and it is located against the bar C, and receives rising and lowering motions from the bar G and springs H. In order to impart the rising motion to the bar G the shaft E carries tappets or cams K, which, bearing against the projecting sides of the upper bosses $f$, elevate the said bar. The lowering motion of the bar is occasioned by the action of a spring, $g$, which, bearing against the bar in order to depress it, is secured to an auxiliary handle, L, projecting horizontally forward from the front plate B.

The operation is as follows: The pan A will be filled with the proper compound, and, in order to receive the same to its greatest capacity, the pan should be held in nearly a horizontal position, as indicated by the dotted lines, Fig. 1. The operator then grasps the projecting handle L, and draws forward the apparatus, and, simultaneously therewith, rotates the crank-handle M of the shaft E, the apparatus running on the wheels F, which may be said to be the running-gear. The pinions $e$ receive rotation from the wheels F, and cause rotation of the tappets or cams K, whereby the arm G will be raised, thus raising the cut-off bar J, and uncovering the openings $C'$ of the bar C. The compound in the pan A immediately flows in streams therefrom through the openings $C'$, but as soon as the tappets K clear the bar G the bar J is quickly depressed, owing to the spring $g$, and, closing the openings $C'$, it cuts through the streams of the compound, and liberates so much thereof as is outside of the pan, thus forming drops which, falling on the table or bed over which the machine is run, are flattened thereby, the formation of the candy-drops being completed, unless further treatment thereof is required. The descent of the bar J also prevents further flow of the compound from the pan, but the apparatus being continuously manipulated the said bar J again ascends and descends, so that the dropping operation is repeated.

The bar C is removably fitted in place, so that bars with openings of different dimensions may be applied, whereby drops of various sizes may be formed. As the compound in the pan A is being expended the back end of the pan should be gradually elevated, so that the compound will flow from the bottom $a$ of the pan to the openings C' of the bar C, and the smallest particle thereof will be directed from the pan, and subjected to the dropping operation.

Having thus described my invention, what I claim as new, and desire to secure by Letters Patent, is—

1. In a drop-candy apparatus, the confectioner's pan A, in combination with gear-wheels F, whereby the apparatus will be run on, and simultaneously operated by, said wheels, substantially as and for the purpose set forth.

2. The pan A and cut-off bar J, in combination with the bar C, formed with openings C', and made removable, substantially as and for the purpose set forth.

3. The cut-off bar J, in combination with the suspension and pressure springs H, substantially as and for the purpose set forth.

4. The pan A, mounted on the axis of the wheels F, and formed with a curved bottom, $a$, the curvature terminating at the perforated bar C', substantially as and for the purpose set forth.

JOSEPH COMBET.

Witnesses:
 JOHN A. WIEDERSHEIM,
 CH. NICHOLAS.